United States Patent
Spahn et al.

(10) Patent No.: US 6,789,778 B1
(45) Date of Patent: Sep. 14, 2004

(54) ELECTROMAGNETIC VALVE

(75) Inventors: Wolfgang Spahn, Germüden (DE); Klemens Strauss, Frammersbach (DE)

(73) Assignee: Hydraulik-Ring GmbH (DE)

( * ) Notice: Subject to any disclaimer, the term of this patent is extended or adjusted under 35 U.S.C. 154(b) by 0 days.

(21) Appl. No.: 09/719,674
(22) PCT Filed: May 28, 1999
(86) PCT No.: PCT/DE99/01577
§ 371 (c)(1), (2), (4) Date: Mar. 26, 2001
(87) PCT Pub. No.: WO99/66239
PCT Pub. Date: Dec. 23, 1999

(30) Foreign Application Priority Data

Jun. 15, 1998 (DE) .......................................... 198 26 579

(51) Int. Cl.$^7$ .............................................. F16K 31/02
(52) U.S. Cl. .............................. 251/129.07; 251/129.16
(58) Field of Search ........................ 251/129.07, 129.16

(56) References Cited

U.S. PATENT DOCUMENTS

| | | | |
|---|---|---|---|
| 2,930,404 A | * 3/1960 | Kowalski et al. | ... 251/129.16 X |
| 4,390,158 A | 6/1983 | Lang | |
| 4,832,312 A | * 5/1989 | Linder et al. | .......... 251/129.07 |
| 5,476,079 A | * 12/1995 | Kanamori et al. | .. 251/129.16 X |
| 5,476,245 A | 12/1995 | Augustin | |
| 5,503,364 A | * 4/1996 | Enomoto et al. | ... 251/129.16 X |
| 5,749,527 A | * 5/1998 | Fujikawa et al. | ... 251/129.16 X |
| 5,878,965 A | * 3/1999 | Coldren et al. | ..... 251/129.07 X |
| 6,116,276 A | * 9/2000 | Grill | ................. 251/129.07 X |

FOREIGN PATENT DOCUMENTS

| | | |
|---|---|---|
| DE | 31 26 246 A1 | 1/1983 |
| DE | 39 05 023 C2 | 8/1990 |
| DE | 40 22 143 A1 | 1/1992 |
| DE | 43 42 398 C1 | 12/1993 |
| DE | 43 05 789 A1 | 9/1994 |
| DE | 44 44 910 A1 | 6/1996 |
| DE | 197 13 858 A1 | 10/1997 |
| DE | 197 00 405 A1 | 7/1998 |
| EP | 0 291 649 A2 | 11/1988 |

* cited by examiner

Primary Examiner—Eric Keasel
(74) Attorney, Agent, or Firm—Morgan Lewis & Bockius LLP

(57) ABSTRACT

A solenoid valve, in particular for limiting the pressure of a fluid, with a flat armature is mounted with an axial gap to a pole core. This pole core is installed in a housing of the solenoid valve and is stressed from both faces with the same fluid pressure.

14 Claims, 2 Drawing Sheets

ELECTROMAGNETIC VALVE

FIELD OF THE INVENTION

The invention relates to a solenoid valve.

DESCRIPTION OF RELATED ART

Solenoid valves of this type are used e.g. as pressure-limiting valves in hydraulic circuits or—more recent—in the control of common-rail diesel injection systems. Such valves are characterized by good response, which makes possible a fast pressure reduction in the system, e.g. in the common rail. In design, an effort has been made to structure the valves so that they are as compact as possible, while the flow resistance should be as low as possible.

A previous solenoid valve in flat armature construction is described in DE 43 05 789 A1, in which a coil form is held in an iron core—called the housing in the following. When the coil winding is not under load, the armature forms an axial slot with a pole core. In the known solution, a plunger is fastened to the flat armature, the free end section of which forms a spherical valve body against a valve seat when it is in base position.

To decrease the manufacturing technology expense in manufacturing the housing, the pole core and the part of the housing that holds the coil form can be designed as two parts—as suggested in DE-OS 31 26 246. In designs such as this, the pole core stressed on its face that is at a distance from the flat armature with the fluid pressure acting on the valve body, so that a resulting pressure force acting in axial direction acts on the pole core. Since the pole core is often mounted by being pressed into the housing, under unfavorable conditions, i.e. with high input pressure and insufficient contact pressure between pole core and housing, it is possible for the pole core to be slid in axial direction toward the flat armature. Because of this change in the air gap, the magnetic force acting on the flat armature can no longer be unambiguously correlated to the opening cross section of the valve seat. This can lead to the fact that the valve response no longer corresponds to the specifications so that recalibration of the solenoid valve is necessary.

BRIEF SUMMARY OF THE INVENTION

In contrast, the present invention is based on the task of producing a solenoid valve in which functional safety is improved with minimum equipment technology expense.

The task is solved by the characteristics of a solenoid valve according to the present invention.

When the solenoid valve shown in FIG. 1 has power supplied to it, the armature 38 is stressed with a force. This axial force is transferred over the armature 38 to the plunger 36 so that its tip presses the valve body 28 against the valve seat 34 and thus the pressure on the input connection P can be varied.

Because of the measure according to the invention of stressing the pole core, which is separate from the housing, axially with about the same pressure, even a high input pressure can not lead to the pole core becoming displaced and the air gap thereby becoming changed. In this way, taking special measurements for axial determination in the housing can be avoided so assembly can be carried out in the previously customary manner, e.g. by pressing or crimping.

Since the input connection is frequently connected to a drain or tank connection by way of the pressure limiting valve, it is especially advantageous if this low system pressure (tank pressure) is applied to both faces of the pole core.

In a preferred variation, the housing is provided with a ring-shaped pole disk, whose side turned toward the armature matches the adjacent face of the pole core so that the axial air gap is limited on side by the armature and on the other side by the pole core and the pole disk.

It is especially simple to manufacture the solenoid valve according to the invention if the pole disk is crimped with the housing.

Usually a plunger is fastened on the flat armature, this plunger acting on the valve body with its free end section and pressing it against the valve seat in basic position (minimum air gap). In this process, the plunger passes through the pole core along its axial direction. In a first alternative, a compensating channel can be formed to produce the pressure compensation between the two pole core faces, in that the plunger cross section is designed with a smaller dimension or with flattened areas, etc. so that a compensating channel is formed between the axial hole of the pole core and the plunger. Alternatively to this, a corresponding channel can be formed on the outer circumference of the pole core so that this compensation channel is delimited by the housing and the outer circumference of the pole core. In both variations, it is insured that the face on the valve seat side and the face on the armature chamber side of the pole core can be stressed with the same pressure with minimum manufacturing technology effort.

This effort can be further reduced if the valve seat is formed on an insert piece that is installed in the housing. In this process, the connection is preferably made by crimping.

In this design, the chamber of the housing formed upstream of the insert piece is connected to the holding chamber for the pole core by way of a connecting hole. In this, the connecting hole is designed so that it is larger than the corresponding outer diameter of the plunger passing through it so that the ring chamber between plunger and connecting hole is part of the compensating channel for stressing the two pole core faces with pressure.

The armature chamber of the housing is preferably closed with a cover that has coil pins passing through it, while sealing rings are provided for the coil pins in the feed-through hole.

The structure of the valve is especially simple if this cover is designed as a connector or pin exit.

In this process, it is especially preferred if the housing is chamfered along some of its circumference for fastening the cover.

Other advantageous further developments of the invention will be apparent from the description and claims that follow hereinafter.

BRIEF DESCRIPTION OF THE SEVERAL VIEWS OF THE DRAWINGS

In the following, preferred embodiments of the invention will be explained in more detail using schematic drawings. They show.

DETAILED DESCRIPTION OF THE INVENTION

Figure 1:
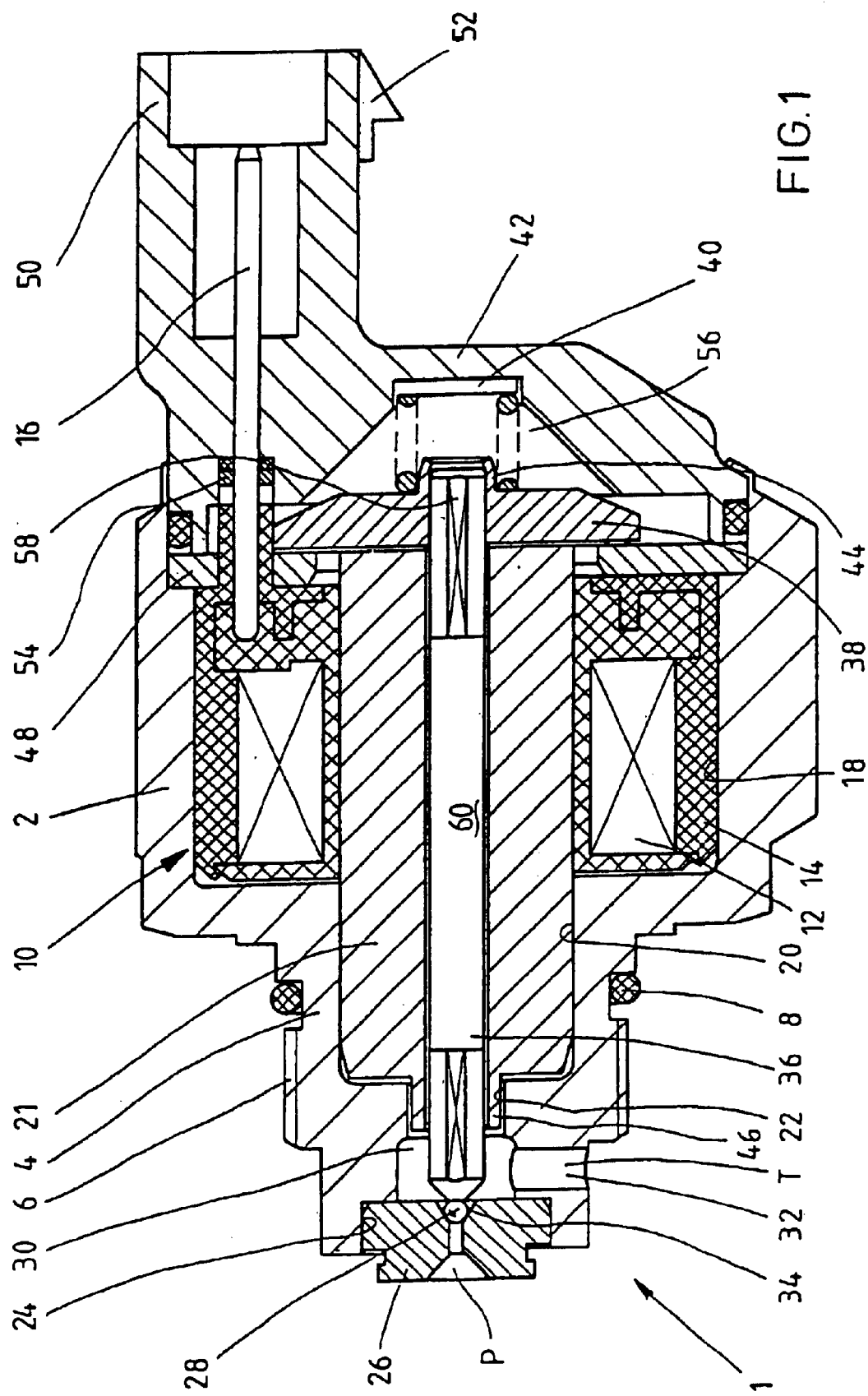
FIG. 1 is a longitudinal cross section through a first embodiment of a solenoid according to the invention.

FIG. 1 shows a longitudinal cross section through a solenoid valve that is designed as a pressure limiting valve for common-rail diesel injection systems. A pressure connection P is connected by way of this solenoid valve 1 to a drain connection, preferably a tank connection T when the system pressure at connection P reaches a specified limit value. It is especially important, in particular in common-rail systems in which the injection pressure must not exceed a predetermined value, if excess pressure can be reduced as quickly as possible. Another criterion is that the pressure limiting valve has a structure that is as compact as possible with low part weight so that a light-weight design with higher reliability can be made available. Theses requirements are fulfilled in an exemplary manner by the solenoid valve according to the invention.

This solenoid valve has a housing 2 manufactured of a magnetic metal, which is designed in cartridge construction and can be screwed into a valve block—or in the present case, into the housing of the rail high pressure pump. For this purpose, an outer thread 6 is formed on a radially recessed insert collar 4, with which a sealing ring 8 is associated for sealing with the rail or the high pressure pump A coil form 10 is held in the radially expanded area of housing 2. This has a winding 12 that is embedded in plastic shroud 14.

Power is supplied to winding 12 by way of pins 16 that extend axially out of housing 2.

In the embodiment shown, housing 2 is designed as a barrel in the view according to FIG. 1, seen from the right, and surrounds a coil chamber 18 for holding the coil form 10 and a holding chamber 20 for a pole core 21, recessed radially compared to coil chamber 18, which in the embodiment is manufactured of the same material as the housing. This holding chamber extends out of coil chamber 18 into the insert collar 4.

A connecting hole 22 that expands in stages to a holder 24 for an insert piece 26, on which a tapered valve seat 34 is formed on input connection P, is connected to the holding chamber 20.

A chamber 30 is formed between the insert piece 26 and the mouth of the connecting hole 22, in which the tank connection T opens out as radial hole 32 (or radial hole star).

In the basic position shown in FIG. 1, the connection between tank connection T and input connection P is closed by means of spherical valve body 28 that is prestressed against valve seat 34 by a plunger 36. The contact area of plunger 36 to valve body 28 is reduced conically.

On the end section of the plunger 36 furthest from valve seat 34, a flat armature 38 is mounted on which a compression spring 40 engages that is supported on a plastic cover of housing 2. In the embodiment shown, the right end section of plunger 36 passes through the flat armature 38. In this process, the plunger is designed with a press fit with respect to the center hole of flat armature 38 and additionally chamfered with it by way of chamfer 44 so that an axial displacement of flat armature 38 along plunger 36 during normal operating conditions is almost ruled out. The chamfering 44 forms a hub-shaped section that is surrounded by compression spring 40 and secures it in radial direction.

Pole core 21 is inserted into holding chamber 20 of the housing with press fit and, in the embodiment shown, dips with a hub-shaped projection into connecting hole 22. However, the outer diameter of the hub-shaped projection is smaller than the selected hole diameter so that a ring slot is formed through which fluid, in this case, diesel fuel, can pass through from chamber 30.

The other face of pole core 21 extends through the coil form 10 up to flat armature 38. The relative arrangement is selected in such a way that in the base position shown, i.e. when valve body 28 is contacting valve seat 34, an axial air slot is formed between the right face (view according to FIG. 1) of the pole core 21 and the adjacent large surface of armature 38.

Between the part of coil form 10 surrounding winding 12 and the flat armature 38, a pole disk 48 is mounted in a radial shoulder of housing 2. The connection between housing 2 and this pole disk 48 can occur, for example, because of an axial crimp, so this connection can be produced in an extremely simple manner.

Pole disk 48 overlaps flat armature 38 in radial direction. The large surface pointing toward the latter lies in the face plane of pole core 21 so that the pole piece surrounds the end section of pole core 20 projecting out of coil form 10 in a ring shape, at a distance. As a result, in some sections, the air gap is also delimited by pole piece 48 and flat armature 38.

As can be seen from the upper part of FIG. 1, the pins 16 and a part of the plastic shroud 14 of coil body 10 surrounding it pass through a recess in pole piece 48. Pins 16 also pass through cover 42 of housing 2, whereby in the embodiment shown, in the passage area of the pins 16, a connection housing 50 surrounding them is formed, which together with pins 16 forms a connector exit. Connector housing 50 has a locking projection 52 to connect to the opposite piece of the plug connector.

The pass-through hole for each pin 16 through cover 42 and the connector housing 50 formed with it is expanded on the coil-side end section to hold an O-ring gasket 54 so that there is a seal with the armature chamber 56 delimited by cover 42.

In order to prevent displacement of pole core 21 when there is excessive pressure in chamber 30, armature chamber 46 is connected to chamber 30 by way of a connecting channel so that both faces of the pole core 21 will be stressed with essentially the same pressure.

Several options exist for forming this connecting channel. In the embodiment shown in FIG. 1, the plunger is provided with flattened surfaces 58 so that the pressure fluid (diesel fuel) can escape out of chamber 30 and/or out of armature chamber 46 along the flattened surfaces 58 into the through-put hole of pole core 21.

Since these flattened places 58 have to be produced with relatively great effort, the center area 60 of plunger 36 is designed with a smaller diameter than the two end sections provided with flattened areas 58 so that a ring slot is formed between center area 60 and the peripheral wall of the pass-through hole for pole core 21, which makes passage of the fluid possible.

Alternatively, the flattened areas 58 could naturally also be designed to be interconnected.

In a variation that is not shown, a spiral-shaped or axial peripheral groove can be formed on the outer circumference so that the fluid can go from chamber 30 through the connecting hole 22 and along the left face of pole core 21 into this peripheral recess and from there, along the outer circumference of pole core 21 to armature chamber 45 so that in this way, the same pressure is also present in chambers 56 and 30.

As a modification from the embodiment shown in FIG. 1, the projection of pole core 21 that dips into connecting hole 22 can be eliminated so its left face is designed so that it is flat. What is important is that the fluid can pass through the connecting hole.

When the power supply is interrupted, the flat armature 38 will be moved back to its initial position because of the force of compression spring 40, whereby plunger 36 presses valve body 28 against valve seat 34 so that the end position of magnetic armature 38 with respect to pole core 21 is determined by the contact of valve body 28 on valve seat 34. The material pairs must therefore be selected in such a way that wear in the area of the valve body 28 contact against plunger 36 and against valve seat 34 is restricted to a minimum so that the width of the air gap remains within the specified tolerances.

Figure 2:
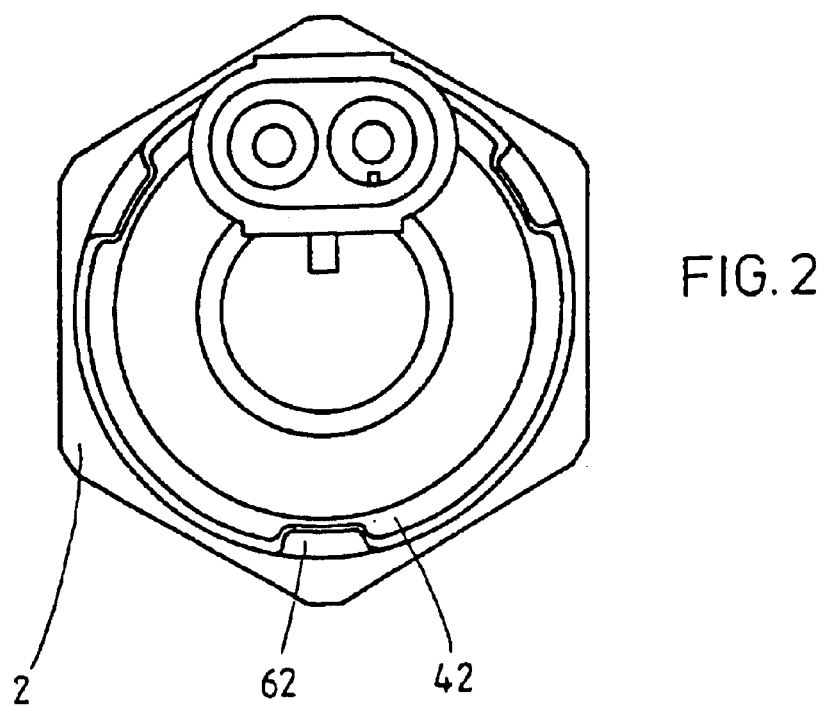
FIG. 2 is a side view of the solenoid valve from FIG. 1.

As can be seen from the representation according to FIG. 2, tabs 62 are formed that are distributed on the outer circumference of housing 2, these tabs being flattened down after the cover 42 seats so that they are fastened to the housing.

Figure 3:
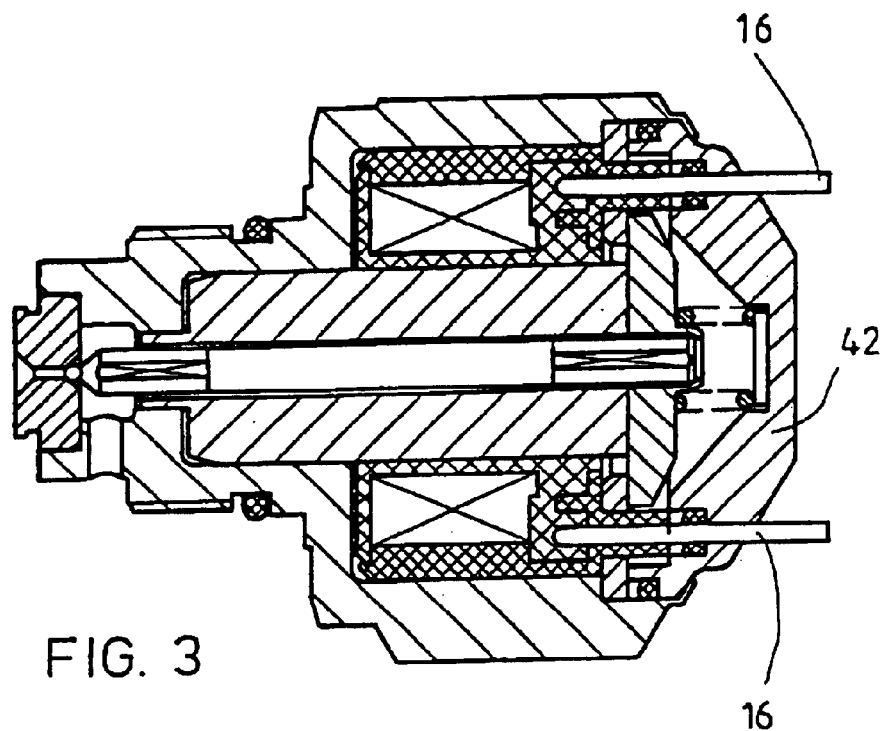
FIG. 3 is a second embodiment of a solenoid valve according to the invention.

FIG. 3 shows an embodiment in which cover 42 is designed as a pin exit and thus has no connector housing 50, but only has pins 16 passing through it. In addition, the structure of the embodiment shown in FIG. 3 corresponds to that of the embodiment shown in FIG. 1 so that further designs can be avoided.

The solenoid valve can be designed with valve seat, as well as with a sliding seat, while in the latter case the plunger runs against a stop that defines a switching position.

The design according to the invention can basically also be used in valves that are open in rest position and then are closed when power is applied to the winding.

The solenoid valve shown is distinguished by an especially simple and compact structure, whereby assembly can be carried out with comparatively little effort. In the assembly, special attention should be given to the correct structure of the air gap and the matching arrangement of pole disk 48 and pole core 21. In a patent application submitted in parallel by the applicant, the corresponding calibration process is described in detail so that reference is made to the elaborations in that parallel patent application, which is designated with internal file number MA7256.

A solenoid valve is disclosed, in particular for limiting the pressure of a fluid, with a flat armature that is mounted with an axial gap from a pole core. This pole core is used in a housing of the solenoid valve and will be stressed with the same fluid pressure from both faces.

What is claimed is:

1. Solenoid valve comprising:
   a housing (2) including a pressure terminal (P) and a flow terminal (F);
   a pole core (21) and a winding (12) being housed in the housing (2), the pole core (21) having an axial wall defining a hole, and the winding (12) surrounding the pole core (21);
   a flat armature (38) being fastened to a plunger (36), the plunger (36) passing through the hole in the pole core (21), and the plunger (36) including flattenings (58) at its ends proximate end faces of the pole core (21);
   an air gap being formed between the pole core (21) and the flat structure (38), the air gap being formed in a first position of the plunger (36) with respect to the pole core (21);
   a valve body (28) being coupled to the plunger (36), the valve body (28) disconnecting the pressure terminal (P) from the flow terminal (F) in the first position of the plunger (36); and
   an annular space (60) defining an equalization channel between the flattenings (58), the annular space (60) being bordered by the plunger (36) and the wall of the pole core (21), the annular space (60) providing fluid communication between the end faces of the pole an (21) and the flow terminal (T).

2. Solenoid valve according to claim 1, characterized by a connecting hole (22) that is formed between a holding chamber (20) for the pole core (21) and a chamber (30) of the housing in fluid communication with the flow terminal (T) through which the plunger (36) passes with radial play.

3. Solenoid valve according to claim 1, characterized in that housing (2) is screw connected with a cover (42).

4. Solenoid valve according to claim 1, characterized in that plug contacts (16), which are connected to the winding (12), are provided outside the flat (38).

5. Solenoid valve according to claim 1, characterized by a pole disk (48) that surrounds the pole core (21) at a distance and that, with the flat armature (38) delimits a partial area of the air gap lying radially on the outside, the pole disk (48) being arranged between the winding (12) and the flat armature (38).

6. Solenoid valve according to claim 5, characterized in that the pole disk (48) is connected to the housing (2).

7. Solenoid valve according to claim 1, characterized in that the valve body is prestressed against a valve seat (34) by the plunger (36).

8. Solenoid valve according to claim 7, characterized in that the valve seat (34) is formed of an insert piece (26) that is fastened in housing (2).

9. Solenoid valve according to claim 1, characterized in that the armature chamber (56) is closed by a cover (42) through which coil pins (16) pass, whereby a gap between coil pin (16) and cover passage is sealed by means of a sealing ring.

10. Solenoid valve according to claim 9, characterized in that the coil pins (16) are formed as connector pins.

11. Solenoid valve according to claim 9, characterized in that housing (2) is screw connected with the cover (42).

12. Solenoid valve according to claim 1, characterized by a pole disk (48) that surrounds the pole core (21) at a distance and that, with the flat armature (38) delimits a partial area of the air gap lying radially on the outside.

13. Solenoid valve according to claim 12, characterized in that the pole disk (48) is connected to the housing (2).

14. Solenoid valve according to claim 12, characterized in that the flat armature (38) overlaps the intermediate pole core (48) in the axial direction.

* * * * *